United States Patent
Karl et al.

(10) Patent No.: US 12,115,864 B2
(45) Date of Patent: Oct. 15, 2024

(54) MOTOR DIAGNOSIS WITH BRAKING TORQUE COMPENSATION FOR ELECTRIC VEHICLES

(71) Applicant: AUDI AG, Ingolstadt (DE)

(72) Inventors: Bernhard Karl, Gaimersheim (DE); Martin Adam, Ingolstadt (DE); Sebastian Heber, Beilngries OT Grampersdorf (DE); Franz Honkomp, Ingolstadt (DE)

(73) Assignee: AUDI AG, Ingolstadt (DE)

( * ) Notice: Subject to any disclaimer, the term of this patent is extended or adjusted under 35 U.S.C. 154(b) by 212 days.

(21) Appl. No.: 17/037,393

(22) Filed: Sep. 29, 2020

(65) Prior Publication Data

US 2021/0094422 A1    Apr. 1, 2021

(30) Foreign Application Priority Data

Sep. 30, 2019    (DE) .......................... 102019126267.4

(51) Int. Cl.
*B60L 3/00*    (2019.01)
*B60K 7/00*    (2006.01)
*B60L 3/12*    (2006.01)

(52) U.S. Cl.
CPC .......... *B60L 3/0061* (2013.01); *B60K 7/0007* (2013.01); *B60L 3/0076* (2013.01); *B60L 3/12* (2013.01); *B60L 2220/14* (2013.01); *B60L 2220/46* (2013.01); *B60L 2240/423* (2013.01); *B60L 2240/429* (2013.01)

(58) Field of Classification Search
CPC ........ B60L 3/0061; B60L 3/0076; B60L 3/12; B60L 2220/14; B60L 2220/46; B60L 2240/423; B60L 2240/429; B60K 7/0007
See application file for complete search history.

(56) References Cited

U.S. PATENT DOCUMENTS

| | | |
|---|---|---|
| 2011/0029179 A1 | 2/2011 | Miyazaki et al. |
| 2019/0308604 A1* | 10/2019 | Kono ........................ B60K 1/02 |
| 2020/0186058 A1* | 6/2020 | Yukawa ................ H02P 29/024 |
| 2020/0317059 A1* | 10/2020 | Mikami ................... B60K 6/26 |

FOREIGN PATENT DOCUMENTS

| | | |
|---|---|---|
| DE | 11 2013 006 972 T5 | 12/2015 |
| DE | 10 2014 214 541 A1 | 1/2016 |
| DE | 10 2015 207 368 A1 | 10/2016 |
| WO | 2005/110826 A1 | 11/2005 |

OTHER PUBLICATIONS

Mutoh, Nobuyoshi et al. "Failsafe Control Methods for EVs with the Failsafe Structure Driven by Front and Rear Wheels Independently", 2007; The World Electric Vehicle Association Journal vol. 1, 2007, pp. 271-278 (Year: 2007).*
English translation of Krell et al. (DE 102014214541) (Year: 2016).*

* cited by examiner

*Primary Examiner* — James M McPherson
*Assistant Examiner* — Kyle J Kingsland
(74) *Attorney, Agent, or Firm* — Seed IP Law Group LLP

(57) ABSTRACT

A method and a device for checking the thermal state of an electric machine of a vehicle driven by at least two electric machines are described.

10 Claims, 2 Drawing Sheets

MOTOR DIAGNOSIS WITH BRAKING TORQUE COMPENSATION FOR ELECTRIC VEHICLES

BACKGROUND

Technical Field

Embodiments of the present invention relate to methods and devices for checking the thermal state of an electric machine of a vehicle driven by at least two electric machines.

Description of the Related Art

With electric vehicles, the possibility exists of checking the state of the electric machines (in particular, of permanently energized synchronous machines (PSM) in that the electric machine is switched to the active short circuit for a very short time during travel. With an active short circuit, the three phases of the electric machine are shorted via the semiconductors of the power electronics. The thermal state of the electric machine can be determined using the resulting currents.

It is, in this case, disadvantageous that the active short circuit produces a braking torque dependent upon the rotation speed. At high driving speeds, this leads to juddering in the vehicle; at low speeds, the braking torque is such that the short circuit diagnosis cannot be used.

A drive arrangement for a motor vehicle is known from DE 10 2014 214 541 A1. The motor vehicle has two, mechanically-coupled electric motors on one axle, which motors are controlled in such a way that a torque discrepancy of a first electric motor is compensated for via a counter-torque of a second electric motor.

DE 10 2015 207 368 A1 discloses a stator for an electric machine, and an electric machine. The electric machine is equipped with several phases, wherein an erroneous torque generated from a phase by a short circuit current is compensated for via a counter-torque of two further phases of the electric machine.

DE 11 2013 006 972 T5 relates to a control device and a control method for a hybrid vehicle. The hybrid vehicle is equipped with two motors which generate a torque, wherein one of the motors is designed as an electric motor with which, in a shifting operation of a transmission of the hybrid vehicle, a counter-torque is generated which counteracts a torque of a further motor.

BRIEF SUMMARY

Against the background outlined above, embodiments of the invention provide a method and a device with which the thermal state of an electric machine of an electric vehicle can be determined even at low driving speeds, and without impairing driving comfort.

DETAILED DESCRIPTION

Figure 1:
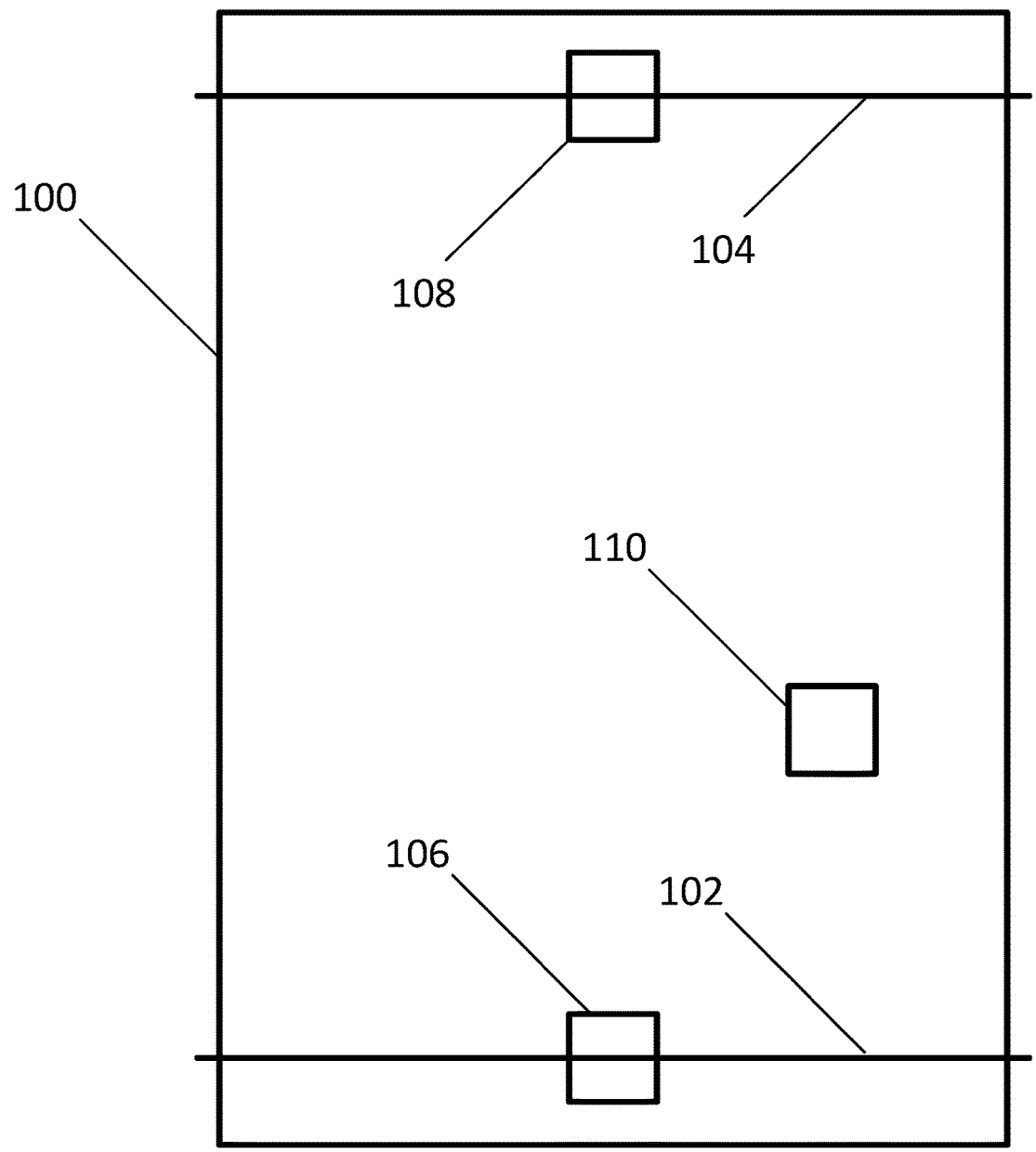
FIG. 1 illustrates a vehicle as described herein.
Figure 2:
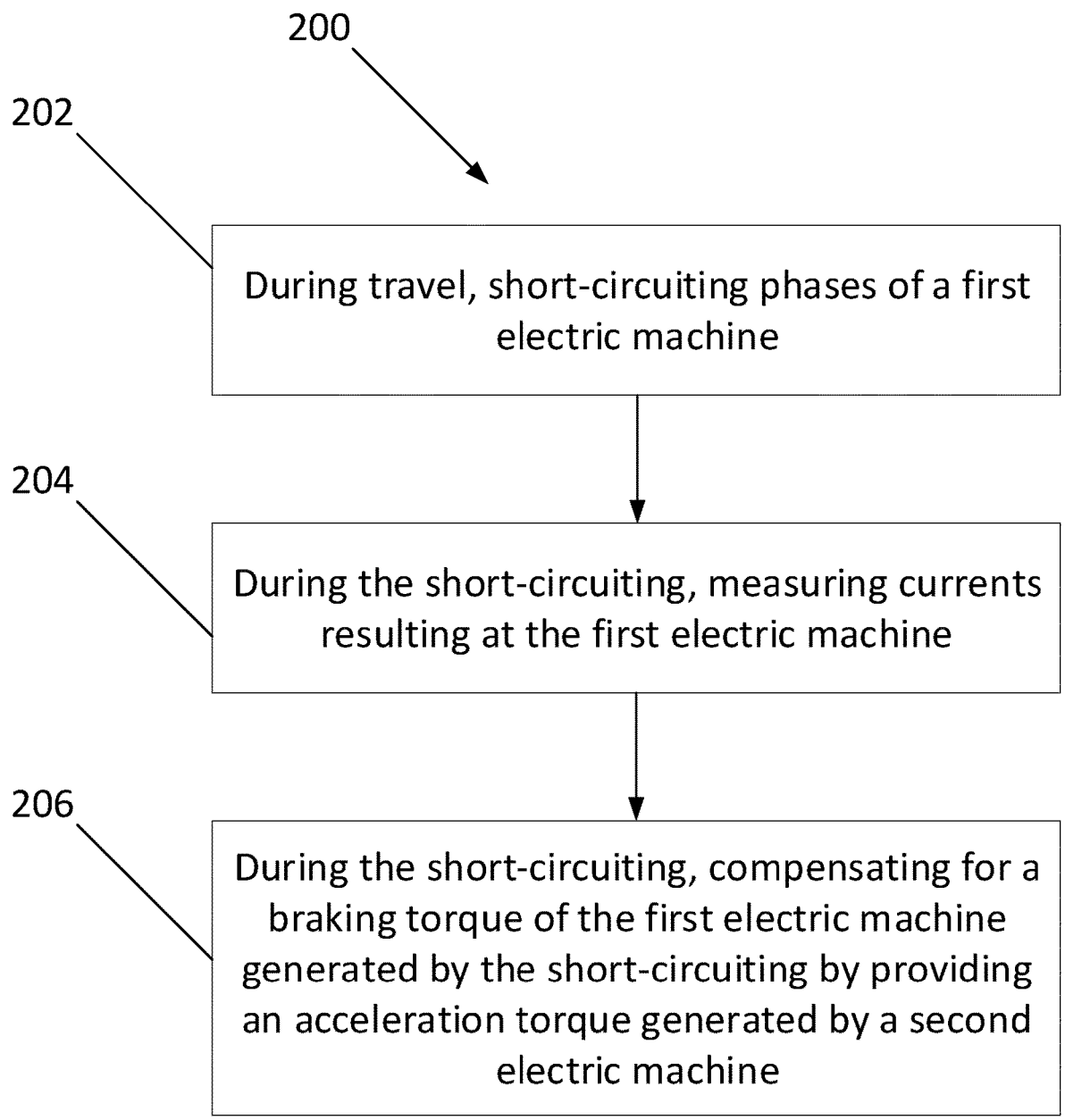
FIG. 2 illustrates a method as described herein.

In one embodiment of the invention, for battery electric vehicles (BEV's) 100 having two electric motors 106, 108—one each on the front axle 102 and on the rear axle 104—the second electric motor compensates for the braking torque of the first electric motor, which is switched into the short circuit. At the torque in which, for example, the front axle is switched into the diagnostic short circuit, the rear axle additionally provides an identical positive torque at the same time.

The subject matter of embodiments of the invention is a method 200 for checking the thermal state of an electric machine of a vehicle driven by at least two electric machines. According to embodiments of the invention, during travel, the phases of one of the at least two electric machines are short-circuited 202 and the resulting currents are measured 204, wherein, at the same time, the braking torque of the electric machine generated by the short circuit is compensated for via an acceleration torque generated by at least one other of the at least two electric machines 206.

In one embodiment of the method, the at least two electric machines are permanently excited synchronous machines.

In one embodiment of the method, the at least two electric machines each have three phases.

In one embodiment of the method, at least one of the electric machines drives a front axle of the vehicle, and at least one other of the electric machines drives a rear axle of the vehicle.

In a further embodiment of the method, the vehicle has four electric machines which each drive one wheel of the vehicle. In a further embodiment of the method, the braking torque generated by the short circuit of the electric machine is compensated for via an acceleration torque generated by another electric machine associated with a wheel on the same side of the vehicle. The generation of an undesired yaw torque is thereby avoided.

In a further embodiment of the method, the two electric machines associated with the wheels of an axle of the vehicle are simultaneously checked. This also thereby prevents an undesired yaw torque from being generated.

The subject matter of embodiments of the invention is also a device for checking the thermal state of electric machines of a vehicle driven by at least two electric machines. The device is, on the one hand, configured to control the torque generation of the at least two electric machines, thus acting as a drive control unit. On the other hand, the device is configured to short the phases of one of the at least two electric machines during travel, and to measure the resulting currents and to determine the thermal state of the electric machine. The device thereby controls at least one other of the at least two electric machines in such a way that an acceleration torque is generated which compensates for the braking torque generated by the short circuit.

In one embodiment, the device is configured to individually control several electric machines each driving individual wheels of the vehicle.

In one embodiment, the device is configured to control the at least two electric machines such that no additional yaw torque is generated during the short circuit.

The request for an electric machine to be checked to go into the diagnostic short circuit is made by the drive control unit 110. At the same time, the request is sent from this control unit 110 to another drive to set a compensation torque matching the rotational speed. The thermal state of the electric motor can thereby be detected by a short circuit and disadvantages potentially arising therefrom be avoided.

Among the advantages of the method and the device according to embodiments of the invention is that they increase the driving comfort, since the drive train does not judder during the diagnosis of one of the electric machines. In addition, the short circuit diagnostic function can also be used at low speeds.

Additional advantages and embodiments of the invention result from the description. It is understood that the features mentioned above can be used not only in the respectively specified combination, but also in other combinations or alone, without departing from the scope of the present invention.

German patent application no. DE 10 2019 126 267, filed Sep. 30, 2019, to which this application claims priority, is hereby incorporated herein by reference in its entirety.

Aspects and features of the various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled.

The invention claimed is:

1. A method, comprising:
while a vehicle is driven by at least two electric machines, sending, by a device, a first request and a second request at a same time, the first request being a short-circuit request sent to a first one of the at least two electric machines, and the second request to being an acceleration torque request sent to a second one of the at least two electric machines;
causing, by the first one of the at least two electric machines in response to receiving the first request sent from the device, a diagnostic short circuit in phases of the first one of the at least two electric machines;
measuring, by the device, currents in the first one of the at least two electric machines while the diagnostic short circuit is caused in the phases of the first one of the at least two electric machines in response to the first one of the at least two electric machines receiving the first request sent from the device;
determining, by the device, a thermal state of the first one of the at least two electric machines using the currents in the first one of the at least two electric machines measured while the diagnostic short circuit is caused in the phases of the first one of the at least two electric machines in response to the first one of the at least two electric machines receiving the first request sent from the device; and
generating, by the second one of the at least two electric machines in response to receiving the second request sent from the device, an acceleration torque that compensates for a braking torque of the first one of the at least two electric machines that results from the first one of the at least two electric machines causing the diagnostic short circuit in response to receiving the first request sent from the device.

2. The method according to claim 1, wherein the at least two electric machines are permanently excited synchronous machines.

3. The method according to claim 1, wherein the at least two electric machines each have three phases.

4. The method according to claim 1, wherein the first one of the at least two electric machines drives a front axle of the vehicle, and the second one of the at least two electric machines drives a rear axle of the vehicle.

5. The method according to claim 1, wherein the vehicle has four electric machines that each drive a respective wheel of the vehicle.

6. The method according to claim 5, wherein the braking torque generated by the diagnostic short circuit of the phases of the first one of the at least two electric machines applies a brake to a first wheel on a first side of the vehicle and is compensated for via an acceleration torque generated by the second one of the at least two electric machines associated with a second wheel on the first side of the vehicle.

7. The method according to claim 5, wherein the first one of the at least two electric machines is coupled to a first wheel coupled to a first axle of the vehicle, and the method further comprises, while causing the diagnostic short circuit in the phases of the first one of the at least two electric machines, causing a diagnostic short circuit in phases of a third electric machine coupled to a second wheel coupled to the first axle.

8. A vehicle, comprising:
at least two electric machines, wherein the vehicle is driven by the at least two electric machines; and
a device which, in operation,
controls torque generation of the at least two electric machines,
sends a first request and a second request at a same time while the vehicle is driven by the at least two electric machines, the first request being a short-circuit request sent to a first one of the at least two electric machines, and the second request to being an acceleration torque request sent to a second one of the at least two electric machines,
wherein, in response to receiving the first request sent from the device, a first one of the at least two electric machines causes a diagnostic short circuit in phases of the first one of the at least two electric machines,
measure currents in the first one of the at least two electric machines while the diagnostic short circuit is caused in the phases of the first one of the at least two electric machines in response to the first one of the at least two electric machines receiving the first request sent from the device,
determines a thermal state of the first one of the at least two electric machines using the currents in the first one of the at least two electric machines measured while the diagnostic short circuit is caused in the first one of the at least two electric machine in response to the first one of the at least two electric machine receiving the first request sent from the device,
wherein, in response to receiving the second request sent from the device, the second one of the at least two electric machines generates an acceleration torque that compensates for a braking torque generated while the device causes the diagnostic short circuit in the first one of the at least two electric machines.

9. The vehicle according to claim 8 wherein the device, in operation, individually controls several electric machines each driving individual wheels of the vehicle.

10. The vehicle according to claim 8 wherein the device, in operation, controls the at least two electric machines so that no yaw torque is generated by the at least two electric machines while the diagnostic short circuit is caused in the first one of the at least two electric machines.

* * * * *